United States Patent
Lindenschmidt et al.

(10) Patent No.: US 7,442,149 B2
(45) Date of Patent: Oct. 28, 2008

(54) DEVICE AND METHOD FOR CONTROLLING A PARKING LOCK HOLDING MAGNET

(75) Inventors: Christoph Lindenschmidt, Rheinstetten (DE); Reinhard Berger, Buehl (DE); Alexander Schweizer, Walzbachtal-Joehlingen (DE); Martin Zimmermann, Sasbach (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 610 days.

(21) Appl. No.: 10/807,030

(22) Filed: Mar. 23, 2004

(65) Prior Publication Data
US 2004/0192498 A1    Sep. 30, 2004

(30) Foreign Application Priority Data
Mar. 26, 2003 (DE) .................... 103 13 379

(51) Int. Cl.
*B60T 7/10* (2006.01)

(52) U.S. Cl. ........................................ 477/197

(58) Field of Classification Search ............... 477/34, 477/194, 197; 74/473.12, 473.21; 192/8 C, 192/219.4, 220.4, 220.7
See application file for complete search history.

(56) References Cited

U.S. PATENT DOCUMENTS

| | | | |
|---|---|---|---|
| 5,827,149 A * | 10/1998 | Sponable | 477/92 |
| 6,361,469 B1 * | 3/2002 | Roder et al. | 477/24 |
| 6,471,027 B1 | 10/2002 | Gierer et al. | 192/219.5 |
| 6,588,294 B1 | 7/2003 | Rogg | 74/473.21 |
| 6,589,134 B2 * | 7/2003 | Williams et al. | 477/99 |
| 2002/0170800 A1 * | 11/2002 | Nagasaka et al. | 192/219.6 |
| 2005/0143220 A1 * | 6/2005 | Berger et al. | 477/96 |
| 2005/0236251 A1 * | 10/2005 | Yamamoto | 192/219.4 |

FOREIGN PATENT DOCUMENTS

| | | |
|---|---|---|
| DE | 198 20 920 | 11/1999 |
| DE | 10259893 A1 * | 7/2003 |
| EP | 0 627 753 | 12/1994 |
| GB | 1119957 | 7/1968 |

* cited by examiner

*Primary Examiner*—Roger Pang
(74) *Attorney, Agent, or Firm*—Davidson, Davidson & Kappel, LLC

(57) ABSTRACT

A device for controlling an electrically-operated holding magnet of a parking lock of a motor vehicle transmission in which a holding magnet supplied with power via a transmission control resettable to a basic setting holds the parking lock in the disengaged state, an apparatus for bridging a reset of the transmission control that maintains the power supply of the holding magnet during the reset being provided.

9 Claims, 1 Drawing Sheet

DEVICE AND METHOD FOR CONTROLLING A PARKING LOCK HOLDING MAGNET

This claims the benefit of German Patent Application No 103 13 379.8, filed Mar. 26, 2003 and hereby incorporated by reference herein.

BACKGROUND INFORMATION

The present invention relates to a device for controlling an electrically-operated holding magnet of a parking lock of a motor vehicle, the holding magnet being controlled by the transmission control in which a reset into a basic setting is possible. In addition, the present invention relates to an electrical circuit configuration including a voltage source and an electrically-operated holding magnet, as well as a method for controlling an electrically-operated holding magnet of a parking lock of a motor vehicle transmission, the holding magnet being controlled via a transmission control.

The above-mentioned motor vehicle transmission may be a transmission of any type that is only characterized in that it has a parking lock. Therefore, it is possible, for example, for the transmission to be a double clutch gearbox, in particular a so-called parallel shift gearbox.

The parking lock of such a transmission typically has a parking pawl that is able to block rotation of the transmission output shaft that is connected to the drive train of the vehicle.

At least one transmission actuator, which may also be used to actively engage and disengage the parking pawl, is provided for the gearshift in such a transmission. This transmission actuator requires an operating power, electric power from the vehicle electrical system, for example. In an emergency situation involving a vehicle system voltage failure, the transmission actuator is no longer able to actively engage the parking lock. To correct this problem, it has become known to engage the parking pawl using a spring-type actuator and to disengage it using the transmission actuator. The parking lock operated in such a way may be held actively disengaged during driving using an electrically-operated holding magnet.

As mentioned above, the solution of using a spring-type actuator to engage the parking pawl has the advantage that the parking lock is also able to be engaged in the event of a power failure. The holding magnet, provided for keeping the parking pawl disengaged, maybe controlled, for example, via the transmission control that may be an electronic control system. Such electronic control systems may be reset to a fixedly-defined basic setting using a reset device. The transmission control is not able to output control signals to the holding magnet during the reset, so that the possibility exists that the holding magnet is not supplied with power during the reset and therefore the parking pawl could become engaged unintentionally during the reset via the spring-type actuator.

Of course, such a reset may also occur during driving of the motor vehicle, e.g., for correcting a fault memory, so that precautions must be taken so that the parking lock is only engaged when this is the driver's intent and is passed on to the magnet by the transmission control, or when the power supply from the vehicle system voltage fails and the parking pawl is to be engaged to avoid accidental rolling away of the vehicle.

The parking lock however must not be engaged when for a short time period no signals are output from the transmission control to the holding magnet, which may be the case in the event of a reset, for example.

U.S. Pat. No. 6,588,294, hereby incorporated by reference herein, shows a parking pawl engaging a gear.

BRIEF SUMMARY OF THE INVENTION

An object of the present invention is to provide a device and/or a method that avoids the unintentional engagement of the parking pawl during a momentary absence of control signals from the transmission control to the holding magnet, but that ensures that the parking lock is engaged in the event of vehicle power failure.

The present invention provides a device for controlling an electrically-operated holding magnet of a parking lock of a motor vehicle transmission in which a holding magnet, which is supplied with power via a transmission control resettable to a basic setting, holds the parking lock in the disengaged state, and the device having an apparatus for bridging a reset of the transmission control and maintaining the power supply of the holding magnet during the reset.

The present invention also provides a method for controlling an electrically-operated holding magnet of a parking lock of a motor vehicle transmission in which a holding magnet, supplied with power via a resettable transmission control, holds the parking lock in the disengaged state, the power supply of the holding magnet being maintained during a reset of the transmission control.

Therefore, the device and method of the present invention enable the power supply of the holding magnet to be maintained during a reset of the transmission control and avoid an unintentional engagement of the parking pawl.

Energizing the holding magnet via the transmission control makes it possible for the holding magnet to hold the parking lock in the disengaged state. However if a condition occurs that indicates that the parking lock is to be engaged, which is the case, for example, when the driver shifts the selector lever into a "P" position, it is provided according to the present invention that the apparatus interrupts the power supply of the holding magnet as a function of the condition indicating that the parking lock is to be engaged, so that the parking pawl is actively engaged via a spring-type actuator, for example.

Hence, this further refinement of the present invention is advantageous, because a condition, corresponding to the reset of the transmission control, namely a momentary interruption of the signal feed of the holding magnet via the transmission control, would result in a waiting period during engagement of the parking pawl.

The further refinement according to the present invention, namely that the apparatus interrupts the power supply of the holding magnet as a function of a condition that indicates that the parking lock is to be engaged, renders it possible for the power supply of the holding magnet to continue to be maintained and the parking lock not to be engaged unintentionally in the event of a reset of the transmission control, but also for the parking lock to be engaged immediately and without any delay as required by the driver.

According to an advantageous further refinement of the present invention, the apparatus has a reset-delayed timing relay, the reset-delay time of which is adjustable as a function of the reset time, and which maintains the power supply of the holding magnet during the reset.

This means that the reset-delayed timing relay interrupts the power supply of the holding magnet in a case of an emergency, e.g., failure of the vehicle system voltage, so that the holding magnet releases the parking pawl and it may be engaged, however not during the period of a reset of the transmission control since the reset-delay time of the timing relay is selected to be greater than the reset period.

According to a further refinement of the present invention, an electric circuit, including an energy store, the energy output of which is used to continue to maintain the power supply of the holding magnet during the reset, may be provided instead of the reset-delayed timing relay.

The electric energy storer may be a capacitor, for example, which is charged via the vehicle electrical system and which, during a reset of the transmission control, outputs its electric power to a current amplification component, for example, via which the holding magnet is supplied with holding current from the vehicle system voltage, also during the reset.

According to a further advantageous embodiment of the present invention, the apparatus may have a relay or a transistor, which is energized as a function of a condition that indicates that the parking lock is to be engaged, thus interrupting the circuit of the holding magnet.

Energizing this relay or transistor results in the holding circuit of the holding magnet being actively interrupted, when this corresponds to the driver's intent, and in immediate activation of the parking lock.

According to a further refinement of the present invention, it is also possible to substitute the above-mentioned reset-delayed timing relay with an electric circuit.

The electric circuit according to the present invention may include a voltage source and an electrically-operated holding magnet and has a microcontroller, as well as a transistor, a capacitor, and an optocoupler, the microcontroller controlling the transistor for control of the optocoupler in such a way that the optocoupler connects the supply current of the holding magnet through, and, in the event of a reset of the circuit, the capacitor maintains the switching state of the transistor and the optocoupler during the reset in an unchanged manner.

This circuit may be integrated into the transmission control, for example, and has a microcontroller, which controls a transistor, which in turn actively switches toward ground. The capacitor according to the present invention may be simultaneously charged when a transistor, e.g., a field-effect transistor, is switched. A resistor that limits the charging current of the capacitor may be provided. During a reset of the transmission control, the signal of the microcontroller fails for a certain amount of time; the capacitor starts to discharge and continues to hold the transistor in the switched position. Using the output current of the transistor, an optocoupler may be controlled that acts as a current amplifier and via which the holding magnet is supplied with holding current during the reset of the transmission control. An unintentional engagement of the parking lock during the reset of the transmission control may thereby be avoided.

According to a further refinement of the present invention, it is also possible, as a function of the electrical load capability of the above-mentioned transistor, to operate without an optocoupler. The microcontroller controls the transistor in such a way that the transistor connects the supply current of the holding magnet and, in the event of a reset of the circuit, the capacitor maintains the switching state of the transistor during the reset in an unchanged manner, so that the holding magnet is supplied with power via the transistor, which means that the optocoupler may be omitted.

According to a further refinement of the electric circuit, a diode that prevents a discharge of the capacitor via the microcontroller may be provided.

The electric circuit described according to the present invention may be integrated into a device for controlling an electrically-operated holding magnet of a parking lock of a motor vehicle. The motor vehicle transmission described above may be a transmission of any type having a parking lock. The device described above, which maintains the power supply of the holding magnet during the reset of the transmission control, and which may have a reset-delayed timing relay or also an electric circuit as described above, may be an integral part of the motor vehicle transmission.

According to the present invention, a method for controlling an electrically-operated holding magnet of a parking lock of a motor vehicle transmission is also provided, according to which the holding magnet holds the parking lock in the disengaged state and the holding magnet is supplied with power via a transmission control that is resettable to a fixedly defined basic setting, the method providing that the power supply of the holding magnet is maintained during the reset of the transmission control.

According to a further refinement of the method, the power supply of the holding magnet is interrupted as a function of a condition that indicates that the parking lock is to be engaged. This means that the power supply of the holding magnet is interrupted immediately when a condition is met that indicates, e.g., in accordance with the driver's intent, that the parking lock is to be engaged immediately.

The specified condition may be met by an action triggered by the driver, e.g., the driver's shifting of the selector lever into the "P" position or also, for example, the removal of the vehicle's ignition key at a standstill with the parking brake engaged, so that it is detected that the driver intends immediate engagement of the parking lock, and that, according to the method of the present invention, the power supply of the holding magnet is instantly interrupted and the parking lock may be engaged via a spring-type actuator, for example.

BRIEF DESCRIPTION OF THE DRAWINGS

The present invention is explained in greater detail based upon the following, in which.

DETAILED DESCRIPTION

Figure 1:
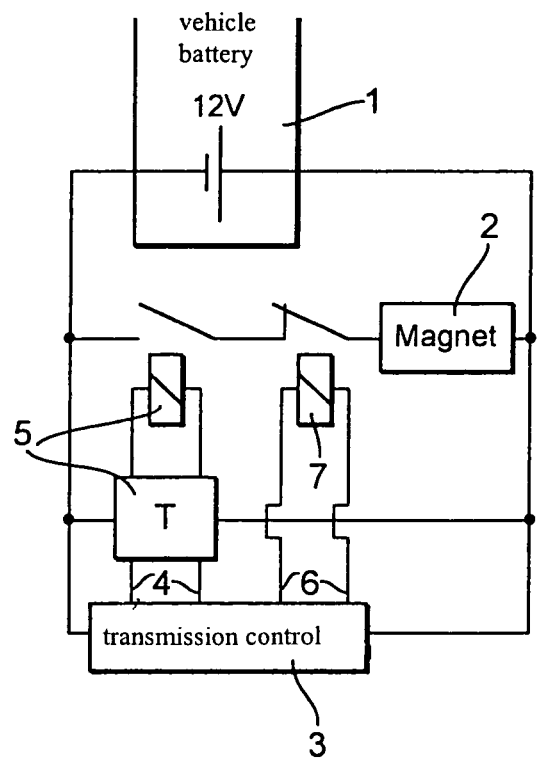
FIG. 1 shows a schematic illustration according to a first embodiment of the device according to the present invention.

FIG. 1 of the drawing shows a schematic illustration of a device for controlling an electrically-operated holding magnet according to a first embodiment of the present invention. A vehicle battery 1 provides the power necessary for the supply of an electrically-operated holding magnet 2.

In the energized state, holding magnet 2 is used to hold a parking pawl in the disengaged, i.e., open, state. A transmission control 3, designed to operate holding magnet 2, is situated in the supply circuit supplied by vehicle battery 1. A reset-delayed timing relay 5 is connected to a first output 4 of transmission control 3 in such a way that the circuit of holding magnet 2, controlled via timing relay 5, may be opened and closed.

A second relay 7, which may be supplied with power via transmission control 3, is connected to a second output 6 of transmission control 3. The mode of operation of second relay 7 is such that by energizing second relay 7, i.e., supplying power to second relay 7, the circuit of holding magnet 2 may be opened, so that this energizing ensures that a spring-type actuator engages the parking pawl, thus activating the parking lock.

This means that relay 7 may be optionally supplied with power from transmission control 3 to open or to close the circuit of magnet 2. If relay 7 is supplied with power, the circuit of holding magnet 2 is opened and the parking lock is activated. If the transmission control does not supply power to second relay 7 via output 6, the circuit of holding magnet 2 remains closed and the parking pawl is held in this manner in the disengaged state. This corresponds to the circumstance, for example, that the motor vehicle equipped with the device according to the present invention is involved in normal vehicle operations and the parking pawl is not to be engaged.

Transmission control 3 is designed in such a way that it may detect the driver's intent for the parking pawl to be engaged.

During normal vehicle operation, reset-delayed timing relay 5 is supplied with power via output 4 so that the circuit of holding magnet 2 is closed and holding magnet 2 holds the parking pawl in the disengaged state. In the event of a reset of transmission control 3 during normal vehicle operation, the signal or the power, supplied to reset-delayed timing relay 5 via output 4, decreases; however, the reset time of reset-delayed timing relay 5 is selected in such a way that the circuit of holding magnet 2 is not opened by relay 5 during this reset, holding magnet 2 thus continuing to hold the parking pawl in the disengaged state.

If, however, transmission control 3 detects that the driver intends to engage the parking pawl, by shifting the selector lever into the "P" position, for example, second relay 7 is supplied with power via output 6, and the circuit of holding magnet 2 is immediately opened, so that the parking pawl is able to be directly engaged via the spring-type actuator without having to wait until the end of the reset-delay time of relay 5.

Instead of above-described second relay 7, a transistor that actively interrupts the power supply of the holding magnet may also be provided, and, in this way, the spring-type actuator directly engages the parking pawl.

Figure 2:
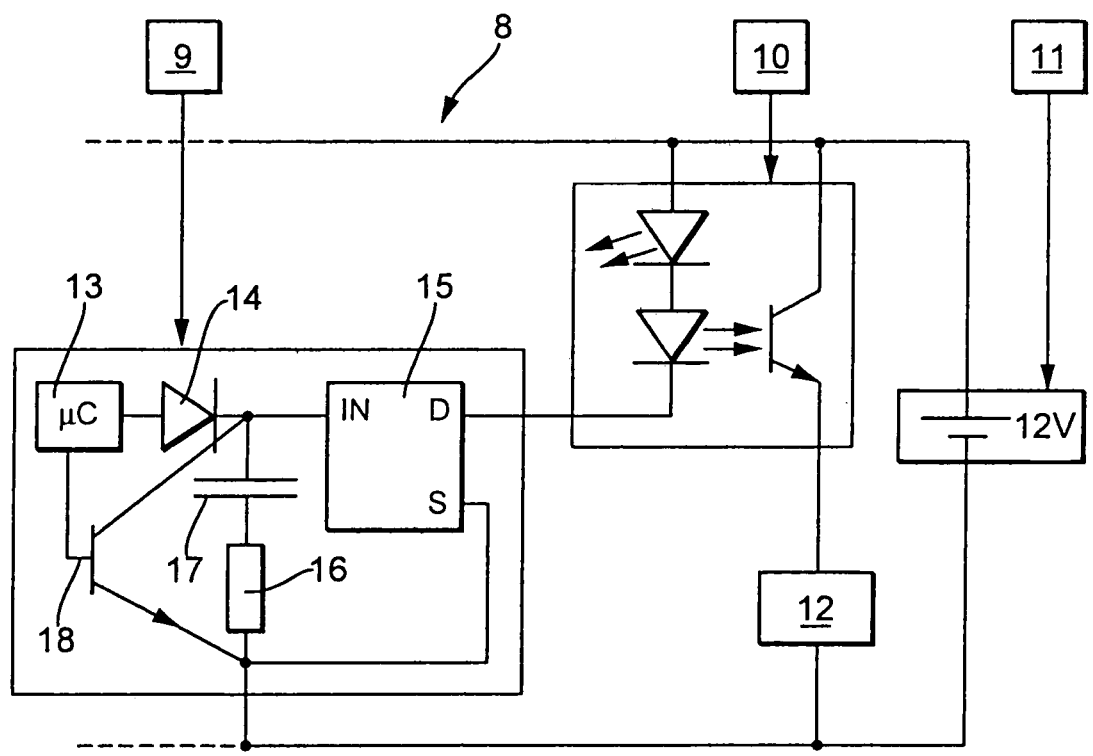
FIG. 2 shows a schematic illustration according to a second embodiment.

FIG. 2 of the drawing shows a second embodiment according to the present invention. In this embodiment, an electric circuit 8 replaces reset-delayed timing relay 5 according to the first embodiment.

Although a second relay 7, as illustrated in the first embodiment, was omitted in FIG. 2 of the drawing, it is possible to combine electric circuit 8, shown in FIG. 2, with such a second relay.

Electric circuit 8, shown in FIG. 2, includes a control unit 9, an optocoupler 10, a vehicle battery 11, and a holding magnet 12.

FIG. 2 of the drawing shows only such components of control unit 9 that are relevant for the present electric circuit. A microcontroller 13 is provided to control a field-effective transistor 15 via a blocking diode 14 in such a way that the transistor switches actively toward ground (vehicle battery 11). With transistor 15 switched, a capacitor 17 is charged via a resistor 16 that limits the charging current. A bipolar transistor may also be used instead of the field-effective transistor.

An optocoupler 10, acting as a current amplifier, is controlled via transistor 15 in such a way that holding magnet 12 is supplied with holding current via vehicle battery 11, thus holding the parking pawl in the disengaged state.

If control unit 9 is reset, the signal, delivered by microcontroller 13, decays momentarily and capacitor 17 starts to discharge. In this case, capacitor 17 acts as a power source for transistor 15, so that optocoupler 10, which in turn supplies holding magnet 12 with holding current from the vehicle system voltage (vehicle battery 11), continues to be controlled via transistor 15, also during the reset. As already explained above, it is also possible in this second embodiment to provide a second relay, corresponding to second relay 7 according to the first embodiment, with which the circuit of holding magnet 12 may be opened instantly, provided that this is the driver's intent.

Instead of second relay 7, a transistor 18 (e.g., an npn bipolar transistor) may be provided (see FIG. 2), which, controlled by microcontroller 13, acts as a switch and immediately interrupts the power supply to holding magnet 12, provided that this is the driver's intent.

Both embodiments make it possible to bridge a reset of the transmission control (control unit 9 may be an integral part of transmission control 3) so that holding magnet 2 or 12 is also supplied with power during a reset of the transmission control, thereby reliably avoiding unintentional engagement of the parking pawl.

Therefore, the device according to the present invention as well as the method according to the present invention are characterized by the fact that, in the event of a power failure representing an emergency situation, the parking pawl of the motor vehicle transmission is reliably engaged; the parking pawl, however, is held in the disengaged state by the holding magnet during a reset of the transmission control. If the transmission control detects that the driver of the vehicle equipped with the device according to the present invention intends to engage the parking lock, the present invention provides for the holding current circuit of the holding magnet to be interrupted immediately without waiting for the maximum reset delay time of a reset-delayed timing relay or the maximum discharge time of the capacitor of the electric circuit provided according to the present invention to elapse.

Reset and reset operation are sued interchangeably herein.

What is claimed is:

1. A device for controlling an electrically-operated holding magnet of a parking lock of a motor vehicle transmission, the holding magnet being supplied with power via a transmission control resettable to a basic setting and for holding the parking lock in a disengaged state, the device comprising:
   an apparatus for bridging a reset operation of the transmission control, the apparatus maintaining a power supply of the holding magnet during the reset operation.

2. The device as recited in claim 1 wherein the apparatus interrupts the power supply of the holding magnet as a function of a condition indicating that the parking lock is to be engaged.

3. The device as recited in claim 1 wherein the apparatus has a reset-delayed timing relay, the reset delay time being settable as a function of the reset time and maintaining the power supply of the holding magnet during the reset operation.

4. The device as recited in claim 1 wherein the apparatus has an electric circuit including an electric energy storer, an energy output of the energy storer maintaining the power supply of the holding magnet during the reset operation.

5. The device as recited in claim 4 wherein the electric energy storer is a capacitor.

6. The device as recited in claim 1 wherein the apparatus has a relay or a transistor energized as a function of a condition that indicates that the parking lock is to be engaged, thus interrupting an energy supply circuit of the holding magnet.

7. A method for controlling an electrically-operated holding magnet of a parking lock of a motor vehicle transmission, the holding magnet being supplied with power via a transmission control resettable to a basic setting and for holding the parking lock in a disengaged state, the method comprising the step of:
   maintaining the power supply of the holding magnet during a reset of the transmission control.

8. The method as recited in claim 7 further comprising interrupting the power supply of the holding magnet as a function of a condition indicating that the parking lock is to be engaged.

9. The method as recited in claim 8 wherein the condition represents an intent of a driver for the parking lock to be engaged, the condition being met by an action triggered by the driver.

* * * * *